United States Patent [19]

Bagrodia et al.

[11] Patent Number: 5,155,176

[45] Date of Patent: Oct. 13, 1992

[54] BLENDS OF COPOLY(ARYLENE SULFIDE) AND POLYAMIDE

[75] Inventors: Shriram Bagrodia; David R. Fagerburg; Joseph J. Watkins; Paul B. Lawrence, all of Kingsport, Tenn.

[73] Assignee: Eastman Kodak Company, Rochester, N.Y.

[21] Appl. No.: 856,273

[22] Filed: Mar. 23, 1992

Related U.S. Application Data

[63] Continuation-in-part of Ser. No. 696,378, May 6, 1991, abandoned.

[51] Int. Cl.⁵ .................... C08G 75/00; C08F 283/04
[52] U.S. Cl. ........................................ 525/420; 525/537
[58] Field of Search ........................... 525/537, 420

[56] References Cited

U.S. PATENT DOCUMENTS

| | | | |
|---|---|---|---|
| 4,292,416 | 9/1981 | Shue et al. | 525/420 |
| 4,524,191 | 6/1985 | Nakamura et al. | 525/425 |
| 4,528,335 | 7/1985 | Selby et al. | 525/420 |
| 4,806,589 | 2/1989 | Chen et al. | 524/539 |
| 4,977,224 | 12/1990 | Watkins et al. | 525/471 |

*Primary Examiner*—John C. Bleutge
*Assistant Examiner*—Helen F. Lee

*Attorney, Agent, or Firm*—Charles R. Martin; William P. Heath, Jr.

[57] ABSTRACT

A composition comprising an admixture of
(A) a copoly(arylene sulfide) corresponding to the structure $$[(-A-S-)_{1-x}(-A-S-S-)_x]_n$$

wherein A is a divalent substituted or unsubstituted aromatic radical, x is in the range of 0.5 to 0.001 and n is at least 25, and
(B) a polyamide corresponding to the general structure $$\left[ \begin{matrix} O & O & H & H \\ \| & \| & | & | \\ -C-(CH_2)_a-C-N-R-N- \end{matrix} \right]$$

or to the general structure $$\left[ \begin{matrix} O & H \\ \| & | \\ -C-(CH_2)_a-N- \end{matrix} \right]$$

5 Claims, No Drawings

BLENDS OF COPOLY(ARYLENE SULFIDE) AND POLYAMIDE

This application is a continuation-in-part of application Ser. No. 07/696,378 filed May 6, 1991, now abandoned.

The invention relates to blends of a copoly(arylene sulfide) and a polyamide.

Poly(arylene sulfide) resins are thermoplastic polymeric materials with good thermal stability, unusual insolubility, resistance to chemical environments and inherent flame resistance. Poly(arylene sulfide) resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment. These polymers can be prepared by reacting p-dichloro benzene with sodium sulfide in a polar organic solvent to produce poly(phenylene sulfide) and the by-product sodium chloride in accordance with U.S. Pat. No. 2,513,188 and U.S. Pat. No. 2,538,941. An improvement on this procedure involves adding N-haloamides as catalysts.

Recently copoly(arylene sulfides) have been discovered. These polymers can be described as having repeating units corresponding to the structure

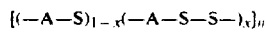

wherein x is in the range of 0.5 to 0.001, A is a divalent aromatic radical and n is at least 200 and is preferably in the range of 500 to 5,000.

It has now been discovered that the rate at which the copoly(arylene sulfide) crystallizes can be increased by blending a polyamide with the copoly(arylene sulfide). This blend can be broadly described as an admixture of (A) from 99.5 to 50 weight percent, based on the weight of the admixture, of a copoly(arylene sulfide) corresponding to the structure

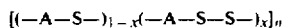

wherein A is a divalent substituted or unsubstituted aromatic radical, x is in the range of 0.5 to 0.001 and n is at least 25, and (B) from 0.5 to 50 weight percent, based on the weight of the admixture, of two particular types of polyamides.

The copoly(arylene sulfide) polymers useful in this invention are identical to the copoly(arylene sulfide) polymers disclosed in U.S. Pat. No. 4,786,713 and U.S. Pat. No. 4,855,393, herein incorporated by reference, except that the minimum value of n of the copoly(arylene sulfide) polymers useful in this invention is lower than the minimum value of n for the copoly(arylene sulfide) polymers which is disclosed in these references. The copoly(arylene sulfide) polymers useful in this invention are therefore inherent in the disclosure of these references because as the molecular weight builds up toward the minimum value of n of at least 200 which is disclosed in these references the molecular weight passes through a molecular weight associated with the lower minimum value of n of 25 of the copoly(arylene sulfide) polymers of this invention. The copoly(arylene sulfide) polymers useful in this invention can be prepared by those skilled in the art by following the teachings of these references and controlling the stoichiometry, time, temperature and other variables of the reaction to achieve a molecular weight associated with a value of n which is at least 25.

The diiodoaromatic compounds which can be utilized to prepare the copoly(arylene sulfide) useful in this invention, include unsubstituted or substituted aromatics which have two iodine substituents. Preferred diiodoaromatic compounds are the diiodobenzenes, diiodonaphthalenes and diiodobiphenyls which may be unsubstituted or substituted. More preferably the diiodoaromatic compounds suitable for the present invention include p-diiodobenzene, m-diiodobenzene, p,p'-diiodobiphenyl, p,p'-diiodobiphenyl, p,p'-diiododiphenyl ether and 2,6- diiodonaphthalene. Most preferably the diiodo compound is p-diiodobenzene.

The polyamides useful in this invention and the method of their preparation are well known in the art. One polyamide useful in this invention corresponds to the structure

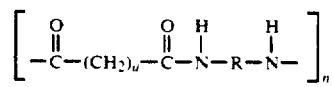

wherein a is an integer in the range of 4 to 12 and is preferably 4,

R corresponds to the structure

wherein b is an integer in the range of 4 to 13 and is preferably 6 or to the structure

wherein c is 0, 1, 2 or 3 and is preferably 0 and n is at least 25, preferably 50.

Examples of these polyamides include poly(hexamethylene-adipamide, poly(hexamethylene sebacamide), poly(hexamethylene dodecane diamide), poly(tridecane biassylamide), and poly(hexamethylene terephthalamide. In the preferred embodiment wherein a is 4 and b is 6 the polyamide is often called poly(hexamethylene adipamide). In the preferred embodiment wherein a is 4 and c is 0 the polyamide is often called poly(cyclohexylene adipamide).

Another polyamide useful in this invention corresponds to the structure

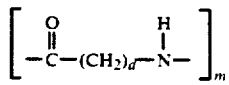

wherein d is an integer in the range of 5 to 11, and is preferably 5, m is at least 50 and preferably is at least 75.

Examples of these polyamides include poly(e-caprolactam); poly(enantholactam), poly(omega-undecaneamide), poly(capryllactum), and poly(omega-pelargonamide). In the preferred embodiment where d is 5 the polyamide is often called poly(e-caprolactam).

The blends of this invention can be prepared by known techniques for blending polymers. For example, the polymers can be coextruded in convention twin screw extrusion equipment. Also, polymers of both polymers may be admixed and the admixed powders extruded in a single screw extruder. Preferably, an admixture of powdered polymer is prepared and the admixture powder is extruded in a single screw extruder.

The amount of copoly(arylene sulfide) is in the range of 99.5 to 50 weight percent, preferably 98 to 75 weight percent, based on the weight of the admixture. The amount of polyamide is in the range of 0.5 to 50 weight percent, preferably 2 to 25 weight percent, based on the weight of the admixture.

The compositions of this invention can be used for preparation of various shaped articles such as pellets, fibers and molded articles. The polymer can be prepared into these shaped articles by conventional processes, such as injection molding, melt spinning, and melt extrusion.

The compositions of this invention can additionally contain fillers, nucleating agents and reinforcing materials in the form of fibers, minerals, powders or mats. For example, the compositions can contain glass fibers, aluminum oxide, calcium oxide, silicon dioxide, Titanium dioxide, copper, kaolin; and the like.

The compositions of this invention are normally solid in the sense that at typical room temperatures and pressures the compositions are in a solid state as compared to a liquid state. The solid character of the composition results from both polymers having a sufficiently high molecular weight to be a solid.

The enhanced rate of crystallization of the composition of this invention is extremely significant. High rates of crystallization enables crystalline shaped articles, such as molded parts, extruded fibers or drawn film, to be more easily prepared because processing time is saved, thereby increasing production efficiency.

In this invention the crystallization rate of the composition of the invention is measured by the difference in the DSC transitions of Tcc−Tch, often referred to by those skilled in the art as the quantity "delta". If two polymers were blended together one would expect the delta value of the blend to be the linear weighted average of the two component polymers. This relationship can be expressed by the equation $$delta_{blend} = delta_1 \times weight\ fraction_1 + delta_2 \times weight\ fraction_2$$

Thus, for example, where equal weights of the copoly(arylene sulfide) and another polymer are employed, the resultant $delta_{blend}$ would be expected to be the average of $delta_1$ and $delta_2$.

The transitions Tcc and Tch are defined by heating the polymer sample in a Differential Scanning Calorimeter (DSC) instrument at a scan rate of 20° C./min. the Tcc is determined by heating the polymer to a molten state, usually 300° C. and then cooling at 20° C./min. The peak of the exotherm observed is defined as the Tcc. The Tch is determined by heating a sample of polymer to the melt again and quenching the sample onto a metal block cooled in dry ice. The thus produced glassy sample is then heated from room temperature up to a melt. The peak of the exotherm observed in this heating sequence is defined as the Tch.

As will be recognized by those skilled in the art, there are numerous cases where either Tcc or Tch will be missing in the DSC trace because of the polymer system crystallization rate being so slow. This is normally a result of higher disulfide levels in the polymer. In such cases, delta becomes undefined and the means of comparison become the transition that does remain, such as Tch. Thus, comparing Tch's of the components and the final blend is also a valid means of assessing the expected transition vs. the one actually observed for the blend. The equation used for comparison is the same as above except substituting Tcc for delta.

The compositions of this invention exhibit enhanced mold shrinkage compared to compositions of the prior art. The mold shrinkage of a polymer is a very significant aspect of the commercial acceptability of a polymeric composition for molding applications. In order for a polymer to be commercially acceptable, an article molded from the polymer must retain its shape during the period of time the article is cooling after being molded. The failure of an article to retain its shape during cooling is generally referred to as warpage. The failure of an article to retain its shape through warpage is a result of the polymer shrinking during the cooling. Thus, the less a polymer shrinks during cooling the less warpage will occur and the better an article will retain its original shape. The compositions of this invention contain enhanced mold shrinkage in the sense that the mold shrinkage of the compositions of this invention are significantly less that the mold shrinkage of similar compositions known in the prior art.

Polymeric compositions can be tested for mold shrinkage by molding flexural bars and determining the length of the bar. The length is then compared to the theoretical length of the mold cavity and the mold shrinkage is calculated as a percentage value as follows:

$$mold\ shrinkage = 100 \frac{(length\ of\ mold\ cavity - length\ of\ bar)}{length\ of\ mold\ cavity}$$

In the examples given below, differential scanning calorimetry (DSC) is performed using a Du Pont 951 Thermoanalyzer instrument and employing a scanning rate of 20° C./min.

EXAMPLE 1

This example illustrates the slow crystallization rate of copoly(phenylene sulfide).

Copoly(phenylene-sulfide) was prepared according to the procedure described in U.S. Pat. No. 4,786,713. The copoly(phenylene sulfide) had a melt viscosity of about 74,000 poise at 320° C. at a shear rate of 25 sec$^{-1}$. The value of x for the copoly(phenylene sulfide) was estimated to be about 0.094 based on elemental analysis. The polymer had a glass transition temperature of about 94° C. as measured by Differential Scanning Calorimetry. The glass transition temperature were determined as follows: the sample was first heated from room temperature to 330° at a heating rage of 20° C./min (first heating cycle). The sample was held at 330° C. for one minute and subsequently quenched to room temperature at 320° C./min. In the second reheat cycle, it was heated at 20° C./min to 330° C., held for one minute at 330° C., and then cooled at 20° C./min. The temperature of crystallization, Tch, was obtained from the exothermic peak temperature during the second reheat cycle. The temperature of crystallization upon cooling, Tcc was obtained during the cooling scan from the melt. The copoly(phenylene sulfide) has a melting point of 265° C. as measured by 1st cycle heating scan on DSC. The copoly(phenylene sulfide) did not show any significant crystallization exotherm during second heating scan or subsequent cooling scan from the melt, thus establishing that the copoly(phenylene sulfide) has a very slow crystallizing material.

EXAMPLE 2

This example illustrates the enhanced rate of crystallization of the compositions of this invention composed of copoly(phenylene sulfide) and poly(hexamethylene adipamide).

Powder of the copoly(phenylene sulfide) prepared in Example 1 was admixed with powdered poly(hexamethylene adipamide), to make a blend containing 80% by weight copoly(phenylene sulfide) and 20% by weight of poly(hexamethylene adipamide). The admixture was dried at 90° for 12 hours in a forced air circulated oven. The polymer admixture was extruded thru an extruder. The temperature at the end of the die was kept at about 300° C. and the rpm of the screw was about 90. The extruded material was analyzed by DSC for thermal transitions. The blended material had a Tch (temperature of crystallization during second heating) of about 112° C. DSC experiment was performed as follows. The sample was first heated from room temperature to 330° C. at a heating rate of 20° C./min (first heating cycle). The sample was held at 330° C. for one minute and subsequently quenched to room temperature at 320° C./min. In the second reheat cycle, it was heated at 20° C./min to 330° C., held for one minute at 330° C., and then cooled at 20° C./min. The temperature of crystallization, Tch, was obtained from the exothermic peak temperature during the second reheat cycle. The temperature of crystallization upon cooling, Tcc was obtained during the cooling scan from the melt. Tcc for the blend was about 222° C. These data illustrate that the compositions of this invention exhibits an enhanced rate of crystallization composed to that of only copoly(phenylene sulfide).

EXAMPLE 3

This example illustrates the faster crystallization rate of the composition of this invention.

Example 2 was repeated except that the amount of poly(hexamethylene adipamide) was 5% by weight. The melt blended material had a Tch of 130.3° C. and Tcc of 202.5° C. The crystallization rate is much higher as compared to 100% copoly(phenylene sulfide) of Example 1.

EXAMPLE 4

This example illustrates the faster crystallization rate of the composition of this invention.

Example 2 is repeated except that the amount of poly(hexamethylene adipamide) is reduced to 1% by weight. The melt blended material had a Tch of 134° C. and tcc of 208° C. These data establish that the composition of the invention exhibits an enhanced rate of crystallization compared to 100% copoly(phenylene sulfide) of Example 1.

EXAMPLE 5

This example illustrates the faster crystallization rate of the composition of this invention.

Example 2 is repeated except that the amount of poly(hexamethylene adipamide) is reduced to 0.5% by weight. The melt blended material had a Tch of 167° C. and Tcc of 153.4° C. These data establishes that the composition of this invention exhibit an enhanced rate of crystallization compared to 100% copoly(phenylene sulfide) of Example 1.

EXAMPLE 6

This example illustrates the faster crystallization rate of the composition of this invention comprises copoly(phenylene sulfide) and poly(e-caprolactam).

Five weight % poly(e caprolactam) was melt blended with 95 weight % of the copoly(phenylene sulfide) used in Example 1. DSC transitions showed a Tch of 123° C. and Tcc of 195.7° C. These data establish a much faster rate of crystallization of the composition of the invention than that for 100% copoly(phenylene sulfide) of Example 1.

EXAMPLE 7

This example illustrates the faster rate of crystallization of the composition of this invention.

5 wt % of poly(omega undecaneamide) was melt blended with 95 wt % of copoly(phenylene sulfide). The procedure was the same as in Example 2. DSC transitions showed a Tch (temperature of crystallization upon heating) of 111° C. and Tcc (temperature of crystallization upon cooling) of 206° C. This again illustrates faster crystallization behavior of copoly(phenylene sulfide) in the blend.

We claim:

1. A composition comprising an admixture of
(A) from 99.5 to 50 weight percent, based on the weight of the admixture, of a copoly(arylene sulfide) corresponding to the structure

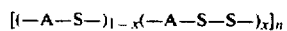

wherein A is a divalent substituted or unsubstituted aromatic radical, x is in the range of 0.5 to 0.001 and n is at least 25, and
(B) from 0.5 to 50 weight percent, based on the weight of the admixture, of a polyamide corresponding to the structure

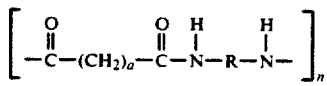

wherein
a is an integer in the range of 4 to 12,
R corresponds to the structure

wherein b is an integer in the range of 4 to 13 or to the structure

wherein c is 0, 1, 2 or 3, and n is at least 25, or a polyamide corresponding to the structure

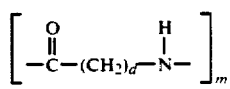

wherein
d is an integer in the range of 5 to 11 and
m is at least 50.

2. The composition of claim 1 wherein the divalent aromatic radical is provided by diiodobenzene, diiodonaphthalene or diiodobiphenyl.

3. The composition of claim 1 wherein the divalent aromatic radical is selected from p-diiodobenzene, m-diiodobenzene, p,p'-diiodobiphenyl, p,p'-diiododiphenyl ether or 2,6-diiodonaphthalene.

4. The composition of claim 1 wherein
a in an integer in the range of 4 to 8,
b is an integer in the range of 4 to 8,
c is 0 or 1
n is at least 25,
d is an integer in the range of 5 to 11, and
m is at least 50.

5. A composition comprising an admixture of
(A) from 98 to 75 weight percent, based on the weight of the admixture, of a copoly(phenylene sulfide) corresponding to the structure

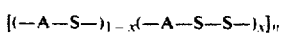

wherein A is a divalent phenylene radical, x is in the range of 0.5 to 0.001 and n is at least 50, and
(B) from 2 to 25 weight percent, based on the weight of the admixture, of a polyamide corresponding to the structure

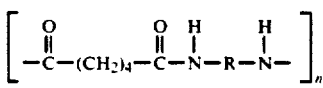

wherein
R corresponds to the structure

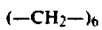

or to the structure

and
n is at least 50,
or a polyamide corresponding to the structure

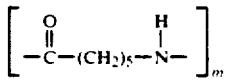

wherein m is at least 75.

* * * * *